Aug. 26, 1941.　　E. G. MELROE　　2,253,797
GRAIN PICKUP FOR COMBINES
Filed Dec. 9, 1940　　4 Sheets-Sheet 1
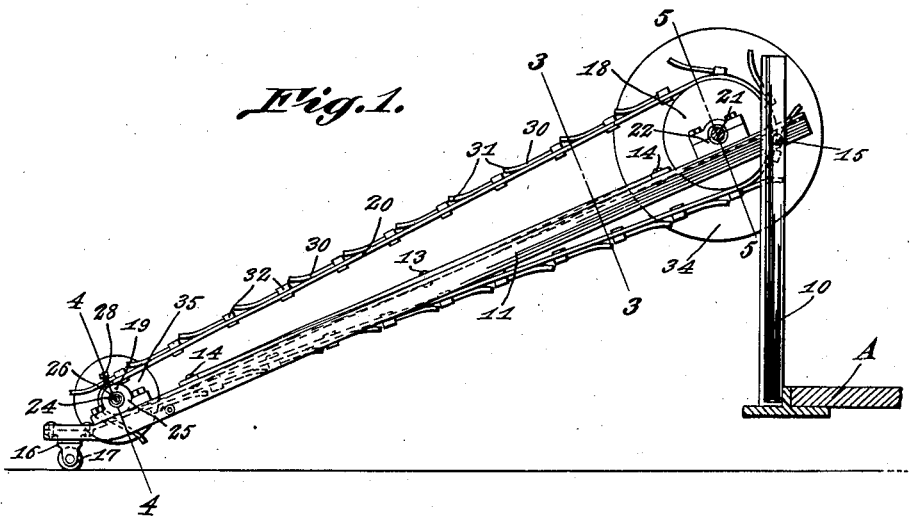
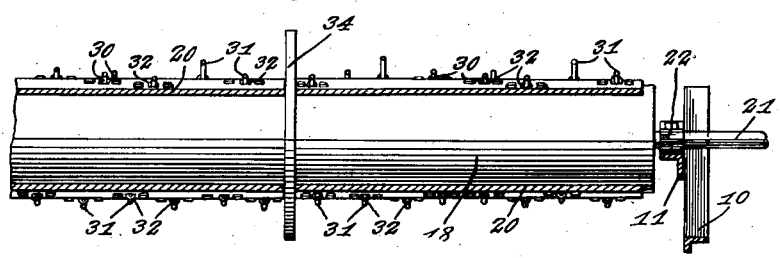
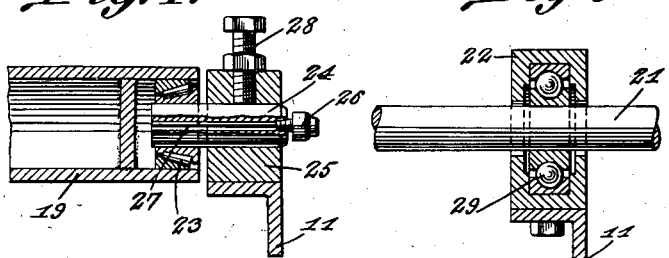
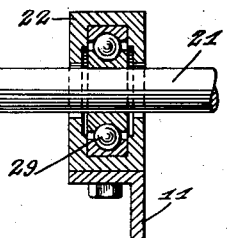
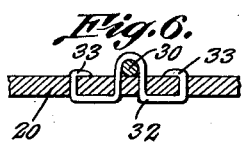
Edward G. Melroe, INVENTOR
ATTORNEYS Aug. 26, 1941.      E. G. MELROE      2,253,797
GRAIN PICKUP FOR COMBINES
Filed Dec. 9, 1940      4 Sheets-Sheet 3
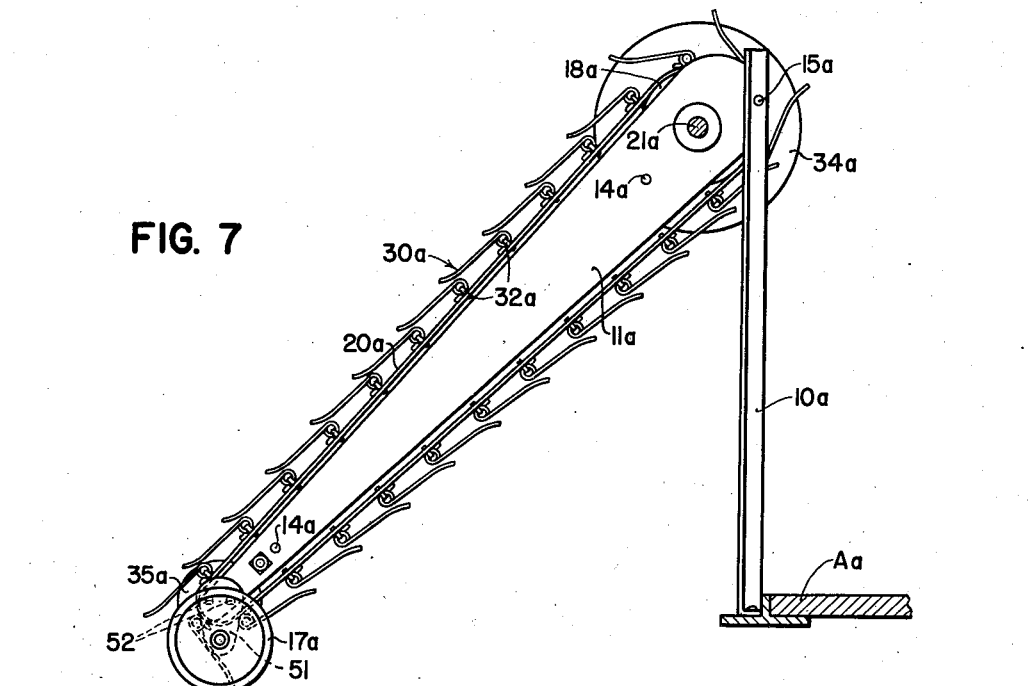
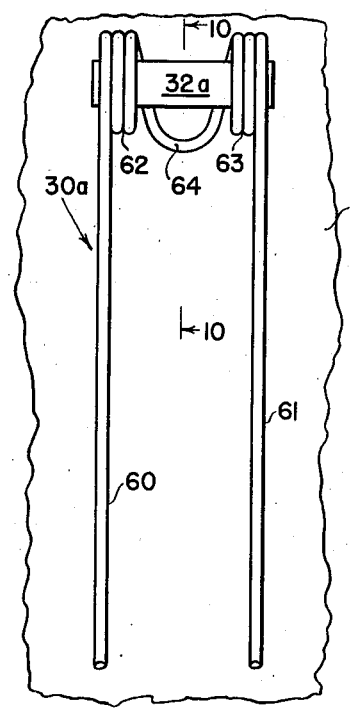
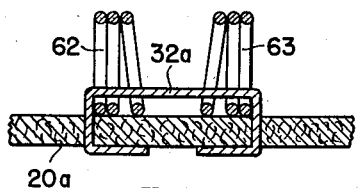
INVENTOR:
EDWARD G. MELROE
ATTORNEYS.

INVENTOR:
EDWARD G. MELROE
ATTORNEYS.

Patented Aug. 26, 1941

2,253,797

UNITED STATES PATENT OFFICE 2,253,797

GRAIN PICKUP FOR COMBINES

Edward G. Melroe, Cogswell, N. Dak.

Application December 9, 1940, Serial No. 369,188

15 Claims. (Cl. 56—364)

This invention relates to a grain pick-up attachment particularly adapted for use with a combination harvester-thresher, commercially known as a combine. This application is a continuation in part of my application, Serial No. 317,583, filed February 6th, 1940.

With the extension of the use of the grain pick-up attachment, incident to the wide use of combines in recent years in practically all of the wheat and other small grain-growing sections of the country, a great deal of trouble has been experienced in those sections where rocks and small stones are prevalent in the field, as is the case in North and South Dakota, Montana, the western part of Minnesota, and in western Canada. While many different types of pick-up attachments have been available to the farmer, all those with which I am familiar have had one common failing when used in the above territory. They have all had the marked tendency to pick up small rocks and stones in the field and deliver them to the conveying mechanism of the combine by which they are carried to the threshing cylinder, where they usually cause serious damage to the threshing cylinder and the other parts of the separator. Such damage to the threshing cylinder is a serious matter to the farmer not only because of the substantial cost of repairs but also because of the loss of valuable time required to make the repairs.

The principal object of my invention is the provision of a grain pick-up free from the tendency to pick up and convey rocks, stones and the like to the combine when drawn over the field to pick up grain from a windrow.

In the carrying out of this objective, I have discovered that in the use of prior pick-ups with which I am familiar, the pick-up fingers of the pick-up in coming in contact with stones, do not immediately pick them up but flip or kick them forwardly into or upon the windrow, to be picked up a moment later and then conveyed to the combine with the windrow. In all prior conveyor belt types of pick-ups of which I am aware, the pick-up fingers have been supported from cross slats fastened to the conveyor belt. Such cross slats, I have discovered, constitute obstructions, interfering with the escape of such stones as are carried up with the windrow.

A further object of my invention is to provide a conveyor belt type of pick-up in which the escape of stones and the like, which are carried up with the windrow, is facilitated by the omission of cross slats or the like. In my improved pick-up, I connect the pick-up fingers directly to the conveyor belt, whereby the space around each pick-up finger is left unobstructed. As a consequence, any stones which are lifted upon the conveyor belt are free to roll or slide forwardly down the incline between adjacent fingers and upon the ground.

A further object of my invention is the provision of a pick-up having pick-up fingers which when coming in contact with stones which are of sufficient size to cause damage to the threshing mechanism of the combine, will not dislodge them, and thus will not kick them forwardly into the windrow, so that no stones will even be carried up with the windrow. I accomplish this objective by providing pick-up fingers having a degree of flexibility several times that of pick-up fingers heretofore commonly used, and of such flexibility that when coming in contact with even relatively small stones they will be deflected over or around the stones, instead of dislodging them and kicking them forwardly. Furthermore, I connect the fingers to the belt by fastening means which takes advantage of the flexibility of the belt to supplement the flexibility of the fingers.

A further object of the invention is the provision of an attachment of this character wherein grain in a windrow will be picked up from the ground and delivered to the combine on the forward movement of the machine, the pick-up fingers being arranged in a novel manner upon an endless belt and under movement thereof will assure activity for the pick-up operation of the attachment.

Another object of the invention is the provision of an attachment of this character wherein one or a series of endless belts when operating through the medium of pick-up fingers arranged in echelon will effectively pick up grain in a windrow upon the ground and convey the same to the combine on advancement of the latter over the ground, the attachment being of novel construction to assure the gathering of a windrow of grain with a minimum of agitation of the grain to eliminate loss of grain by shattering during the pick-up operation.

A further object of the invention is the provision of an attachment of this character, which is simple in construction, durable, efficient in operation and inexpensive to manufacture.

With these and other objects in view, the invention consists in the features of construction, combination and arrangement of parts as will be hereinafter more fully described in detail, illustrated in the accompanying drawings which disclose preferred embodiments of the invention.

One embodiment of my invention is disclosed in Figures 1 to 6 of the accompanying drawings, in which:

Figure 1 is a fragmentary side elevation partly in section of the end portion of a combine platform showing the attachment constructed in accordance with the invention in association therewith.

Figure 3 is a sectional view taken on the line 3—3 of Figure 1.

Figure 4 is a fragmentary sectional view taken on the line 4—4 of Figure 1.

Figure 5 is a fragmentary sectional view taken on the line 5—5 of Figure 1.

Figure 6 is a fragmentary detail sectional view showing the mounting or fastening of a pick-up finger to the conveyor belt of the pick-up attachment.

Another embodiment of my invention is disclosed in Figs. 7 to 11 in which:

Figure 7 is a view similar to Figure 1.

Figure 8:
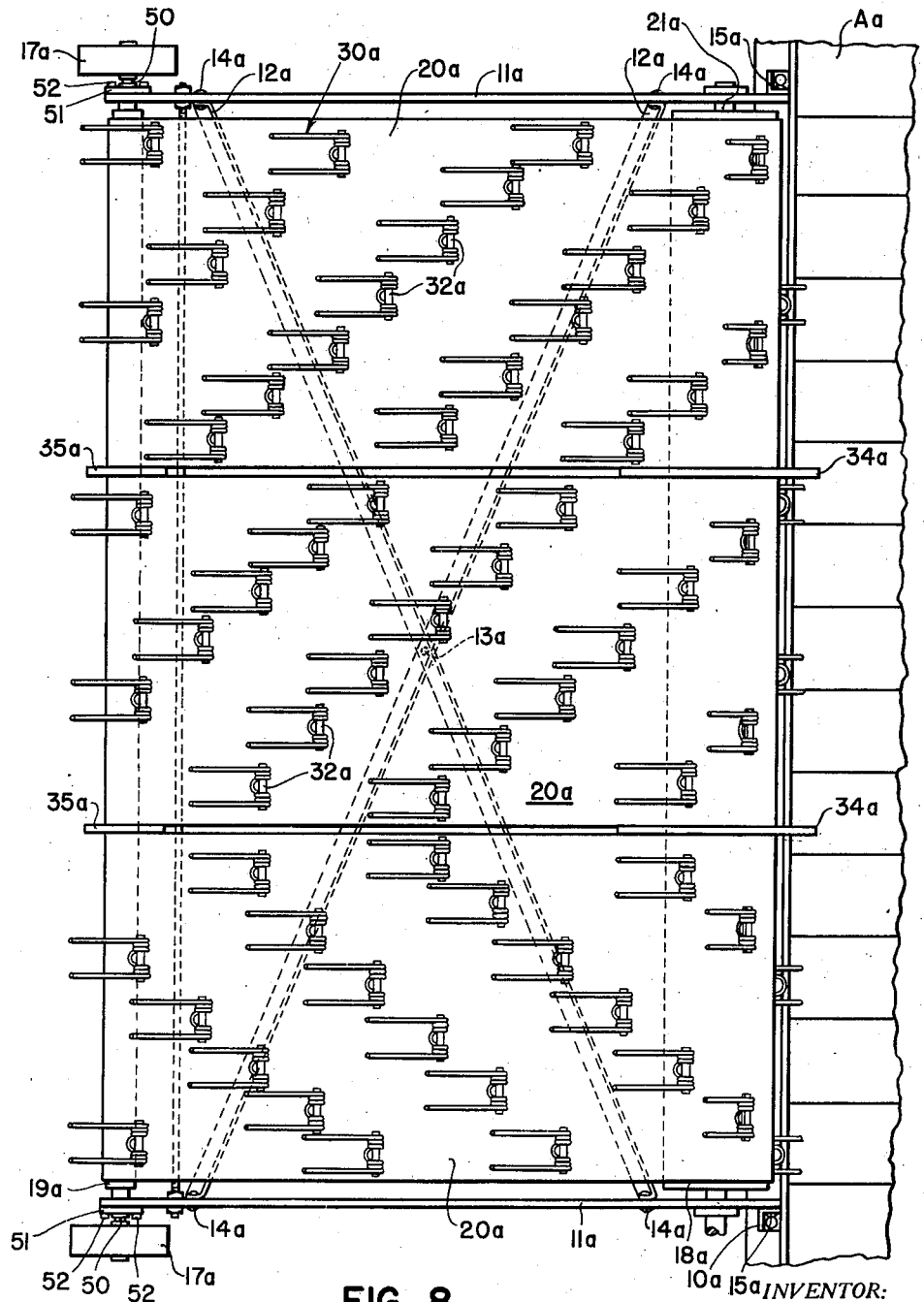

Figure 8 is a top plan view.

Figure 9 is an enlarged view of one of the pick-up fingers.

Figure 10 is a sectional view taken on the line 10—10 of Figure 9.

Figure 11 is a sectional view taken on the line 11—11 of Figure 10.

Similar reference characters indicate corresponding parts throughout the several views in the drawings.

Referring to Figures 1 to 6 of the drawings in detail, A designates generally a portion of the platform of a combine, being of any standard construction and has built therewith a pair of spaced uprights or posts 10 to which is connected the pick-up attachment constituting the present invention.

The attachment constituting the present invention comprises a pair of spaced parallel forwardly inclined side sills or beams 11, these being joined together through the medium of crossed connecting bars 12 which at the crossing point thereof are joined by a fastener 13 while the ends of the said bars are joined to the sills or beams 11 by fasteners 14 or otherwise. The sills or beams 11 and the crossed bars 12 joined therewith and with each other create a rigid frame which is adapted for vertical swinging movement. The upper ends of the sills or beams 11 are pivoted at 15 to the uprights or posts 10 for the vertical swinging of said frame.

The sills or beams 11 at the lower ends thereof are slightly bent to be disposed substantially parallel with a ground level and to these ends are fixed caster bearings 16 having ground caster wheels 17 for travel upon the ground surface.

Next to the upper and lower ends of the sills or beams 11 are driving and idle rollers 18 and 19, respectively, about which are trained one or a series of endless conveyor belts 20, preferably made from canvas, or regular belting material. The roller 18 has its axle 21 journaled in bearings 22 and such axle is adapted for connection with power mechanism for imparting travel to the belts 20.

The roller 19, which is an idle roller, at each end thereof is equipped with anti-friction bearings 23 coacting with a stud axle 24 fixedly held in a bearing 25 therefor upon the sill or beam 11. The stud axle 24 is fitted with a grease cup 26 for delivering lubricant through a lubricating passage 27 into the roller 19 for lubrication of the anti-friction bearings 23 equipped therewith.

The stud axle 24 is held fast in the bearing 25 by a binding screw 28 fitting said bearing 25.

It is preferable to have the bearings 22 for the axle 21 equipped with anti-friction bearings 29.

Arranged on each belt 20 in diagonally disposed spaced rows or in echelon are pick-up fingers 30, each of which in this embodiment comprises a single tine, each including a straight shank and an outturned free tip, the latter being indicated at 31. Each finger 30 is joined directly and individually to the belt 20 at its rear end with a single staple 32 disposed transversely of the belt. The staple 32 bears upon the rear end of the finger 30 and is clenched at 33 in the body of the belt 20 at each side of the finger. This joinder of the finger with the staple and the mounting of the latter in the belt disposes the shank of such finger close to and approximately flat against the belt with each of said fingers being forwardly directed relative to the direction of travel of the combine throughout the upper run of the belt. When the conveyor belt passes around rollers 18 and 19, the fingers 30 project away from the belt, and those fingers passing around the lower roller 19 will pick up grain in the windrow and lift it upon the belt 20, whereupon it will be conveyed upwardly to the upper end thereof. As the tines pass around the upper roller 19, the grain will be discharged by the fingers onto the platform A, the operation being continuous in the forward travel of the combine.

Figure 2:
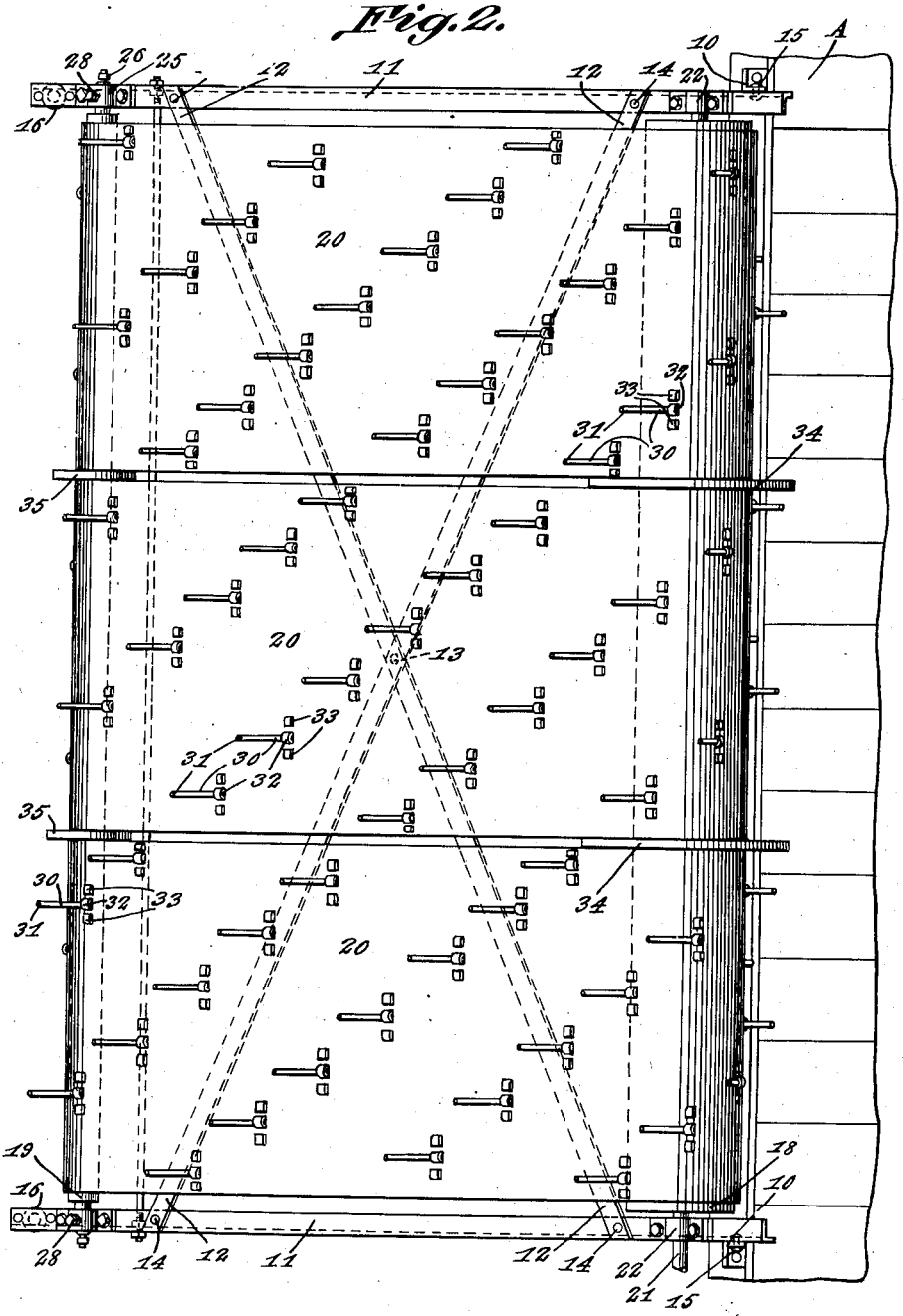
Figure 2 is a top plan view.

Rollers 18 and 19 between the belts 20 are provided with separator disks or flanges 34 and 35, respectively, to sustain belts 20 in their arrangement as disclosed in Figure 2 of the drawings. The separator disks also function to keep any grain from wrapping upon the rollers between the belts.

Disposition of the staple 32 in a transverse position provides for smooth travel of the belt around the rollers 18 and 19 and also provides for the maximum fore-and-aft movement of the fingers by virtue of the flexibility of the belt itself. Connection of the fingers to the conveyor belt at their rear ends, so as to dispose the fingers downwardly and forwardly and to lie substantially flat against the belt throughout the inclined portion of the conveyor, facilitates the escape of stones which may be carried upon the conveyor with the windrow. The echelon arrangement of the fingers further facilitates the escape of stones carried upon the conveyor by providing unobstructed downwardly inclined pathways down which the stones may roll or slide.

Preferably the lower roller 18 is of relatively small diameter in order to make it possible to carry the pick-up close to the ground. This avoids the necessity of having to lift the windrow more than a few inches before being delivered to the inclined portion of the conveyor. The upper roller 19 is relatively large, which I find facilitates the gentle delivery of the windrow to the combine platform.

The embodiment disclosed in Figs. 7 to 11 is similar to that previously described, except for the construction of the pick-up fingers, and for a minor modification in the frame construction. Corresponding parts have been designed with the same reference numerals with the suffix "a" added.

In this embodiment, the side beams 11a are constructed of plate stock, and the wheels 17 are non-castering and are journaled on studs 50 extending laterally from the lower ends of depending brackets 51. At their upper ends, brackets 51 are fixed to the forward ends of beams 11ᵃ by bolts 52.

Fingers 30ᵃ are made as an assembly, each comprising two tines 60 and 61 terminating in spring coils 62 and 63 connected by a loop 64. Fingers 30ᵃ are fastened to the belt by staples 32ᵃ, which pass through the coils and bear down against the coil loops to retain the fingers in proper operating position. The spring coils give the fingers increased flexibility.

In all prior spring finger pick-ups with which I am familiar, the fingers have been made of wire of about No. 6 gauge, which is about $\frac{3}{16}$ of an inch in diameter. I have found that fingers of this size, even though made as spring coil fingers similar to the fingers 30ᵃ, especially when rigidly fixed to a cross slat, do not provide the degree of flexibility necessary to leave undisturbed stones of the size which cause damage to the threshing mechanism, that is, stones of the size of walnuts or larger. Stones appreciably smaller than walnuts can pass through the threshing mechanism without damage thereto. In my improved pick-up, I preferably use fingers of about No. 14 gauge wire which is in the range of 0.08 of an inch in diameter, as I have found wire of about such diameter necessary to obtain the flexibility required to prevent displacement of stones of walnut size. I also find it desirable to double the number of fingers over that conventionally used on prior conveyor type pick-ups. As a result, the action of my pick-up might be described as a brushing or sweeping action, brushing the grain upon the conveyor as distinguished from that of prior designs in which the action is more of a raking action in which the teeth scratch the ground surface to pick up the windrow, and in so doing dislodge stones and kick them forwardly into the windrow.

Heretofore the pick-up has been the principal if not the sole cause of the presence of stones in the windrow, since rarely is a stone picked up by the windrower by which the grain is cut and deposited in a windrow as such machine is almost always run six inches or more above the ground and appreciably above any stones that may be present. Thus, by the use of my improved pick-up, so constructed that it will not dislodge stones of the size which would do damage to the combine and thus will not kick them into the windrow, and so constructed that any stones which are carried up with the windrow are free to escape by sliding or rolling down the conveyor upon the ground, I have practically eliminated the possibility of any stones being carried into the combine with dangerous results, and so have eliminated one of the most serious difficulties farmers of the Northwest have been experiencing in the harvesting of their crops by the combine pick-up method.

What I claim is:

1. A pick-up adapted to be attached to a traveling harvester comprising an endless conveyor consisting of at least one flexible endless belt trained over upper and lower rollers, means for supporting said conveyor in a downwardly and forwardly inclined position with the lower end thereof in close proximity to the ground, and a plurality of flexible pick-up fingers individually attached at one end directly to said endless belt, and means for driving the conveyor with the upper run traveling upwardly and rearwardly to cause the pick-up fingers to pick up a windrow and convey it to the harvester as the latter is drawn over the field, the flexibility of the belt adjacent the points of attachment of the fingers thereto augmenting the flexibility of the fingers.

2. A pick-up adapted to be attached to a traveling harvester comprising an endless conveyor consisting of at least one flexible endless belt trained over upper and lower rollers, means for supporting said conveyor in a downwardly and forwardly inclined position with the lower end thereof in close proximity to the ground, and a plurality of flexible pick-up fingers individually attached at one end directly to said endless belt, the free end of said fingers being directed rearwardly relative to the direction of travel of the conveyor, and means for driving the conveyor with the upper run traveling upwardly and rearwardly to cause the pick-up fingers to pick up a windrow and convey it to the harvester as the latter is drawn over the field, the flexibility of the belt adjacent the points of attachment of the fingers thereto augmenting the flexibility of the fingers.

3. A pick-up adapted to be attached to a traveling harvester comprising an endless conveyor consisting of at least one flexible endless belt trained over upper and lower rollers, means for supporting said conveyor in a downwardly and forwardly inclined position with the lower end thereof in close proximity to the ground, and a plurality of flexible pick-up fingers individually attached at one end directly to said endless belt, the free ends of said fingers being directed rearwardly relative to the direction of travel of the conveyor and disposed substantially parallel to the upper run of the conveyor, and means for driving the conveyor with the upper run traveling upwardly and rearwardly to cause the pick-up fingers to pick up a windrow and convey it to the harvester as the latter is drawn over the field, the flexibility of the belt adjacent the points of attachment of the fingers thereto augmenting the flexibility of the fingers.

4. In a pick-up adapted to be attached to a traveling harvester and comprising an endless conveyor consisting of an upper and a lower roller, two endless belts trained over the rollers closely adjacent one another and having a plurality of pick-up fingers thereon, and means for supporting the lower roller in close proximity to the ground as the harvester is drawn over the field to pick up a windrow and convey it to the harvester, a disk of substantially larger diameter than the upper roller mounted thereon and disposed between the two belts, the adjacent edges of the belts being disposed to run against the opposite sides of the disk, whereby said belts are maintained in spaced relation and the windrow is raised from said belts and delivered to the harvester.

5. A pick-up adapted to be attached to a traveling harvester comprising an endless conveyor consisting of an endless flexible belt trained over upper and lower rollers, means for supporting said conveyor in a downwardly and forwardly inclined position with the lower end thereof in close proximity to the ground, a plurality of flexible pick-up fingers on said conveyor, means for individually fastening each of said fingers to said belt comprising a single staple disposed transversely of the conveyor across the end of the finger and fixed to the belt at its ends on opposite sides of the finger, and means for driving the conveyor with the upper run traveling upwardly and rearwardly to cause the pick-up fingers to pick up a windrow and convey it to the harvester as the latter is drawn over the field, the flexibility of the belt adjacent the points of attachment of the fingers thereto augmenting the flexibility of the fingers.

6. A pick-up of the class described comprising an endless conveyor consisting of an endless flexible belt trained over upper and lower rollers, means for supporting said conveyor in a downwardly and forwardly inclined position with the lower end thereof in close proximity to the ground, a plurality of pick-up fingers on said conveyor, each finger comprising a pair of tines each terminating in a coil, the two coils of each pair of tines being connected by a loop, means for individually fastening each of said fingers to said belt comprising a single staple disposed transversely of the conveyor and extending through the coils and fixed to the belt at its ends on opposite sides of the finger.

7. A pick-up adapted to be attached to a traveling harvester comprising an endless conveyor consisting of at least one flexible endless belt trained over upper and lower rollers, means for supporting said conveyor in a downwardly and forwardly inclined position for picking up a windrow and conveying it to the harvester as the latter is drawn over the field, and a plurality of pick-up fingers on said belt, means for driving the conveyor with the upper run traveling rearwardly and the lower run traveling forwardly, said fingers being disposed to brush the ground surface as the conveyor belt passes around the lower roller, said fingers being of such degree of flexibility as to be incapable of dislodging stones of walnut size upon the ground upon coming in contact therewith in brushing the ground surface.

8. A pick-up adapted to be attached to a combine having a threshing mechanism comprising an endless conveyor consisting of at least one flexible endless belt trained over upper and lower rollers, means for supporting said conveyor in a downwardly and forwardly inclined position for picking up a windrow and conveying it to the threshing mechanism of the combine as the latter is drawn over the field, a plurality of relatively flexible pick-up fingers, means for individually fastening each finger to said conveyor belt comprising a single relatively narrow staple disposed transversely of the belt, means for driving the conveyor with the upper run traveling rearwardly and the lower run traveling forwardly, said fingers being disposed to brush the ground surface as the conveyor belt passes around the lower roller, the flexibility of said fingers and the flexibility of said belt at opposite sides of said staples being such as to render said fingers incapable of dislodging stones upon the ground too large to pass through the threshing mechanism of the combine without damage thereto.

9. A conveyor belt, comprising a flexible body, a plurality of elongated tines resting thereon and extending longitudinally of the body and having outwardly turned ends, and staples straddling the opposite ends of the tines and rigidly joined to the upper face and side walls of the tines and the prongs of the staples extending through the body and outwardly transverse the tines and upwardly through the body and their extreme ends clinched inwardly upon the upper face of the body.

10. A pick-up adapted to be attached to a traveling harvester comprising an endless conveyor consisting of at least one flexible endless belt trained over upper and lower rollers, means for supporting said conveyor in a downwardly and forwardly inclined position with the lower end thereof in close proximity to the ground, and a plurality of yielding pick-up fingers individually attached at one end directly to said endless belt, and means for driving the conveyor with the upper run traveling upwardly and rearwardly to cause the pick-up fingers to pick up a windrow and convey it to the harvester as the latter is drawn over the field, the yieldability of said fingers being sufficient to cause the latter to pass over rocks of walnut size without dislodging them upon engagement therewith as the harvester is drawn over the field.

11. A pick-up adapted to be attached to a traveling harvester comprising an endless conveyor consisting of at least one flexible endless belt trained over upper and lower rollers, means for supporting said conveyor in a downwardly and forwardly inclined position with the lower end thereof in close proximity to the ground, and a plurality of yielding pick-up fingers individually attached at one end directly to said endless belt, each finger comprising a plurality of tines disposed in parallel and connected at the end at which the finger is attached to the belt, and means for driving the conveyor with the upper run traveling upwardly and rearwardly to cause the pick-up fingers to pick up a windrow and convey it to the harvester as the latter is drawn over the field, the yieldability of said fingers being sufficient to cause the latter to pass over rocks of walnut size without dislodging them upon engagement therewith as the harvester is drawn over the field.

12. A pick-up adapted to be attached to a traveling harvester comprising an endless conveyor consisting of at least one flexible endless belt trained over upper and lower rollers, means for supporting said conveyor in a downwardly and forwardly inclined position with the lower end thereof in close proximity to the ground, and a plurality of pick-up fingers individually attached at one end directly to said endless belt, and means for driving the conveyor with the upper run traveling upwardly and rearwardly to cause the pick-up fingers to pick up a windrow and convey it to the harvester as the latter is drawn over the field, the flexibility of the belt adjacent the points of attachment of the fingers thereto facilitating the passage of the fingers over rocks of walnut size without dislodging them upon engagement therewith as the harvester is drawn over the field.

13. In a pick-up adapted to be attached to a traveling harvester and comprising an endless conveyor consisting of an upper and a lower roller, two endless belts trained over the rollers closely adjacent one another, means for supporting the lower roller in close proximity to the ground, means associated with said belts for picking up a windrow and depositing it upon said belts as the harvester is drawn over the field, and a disk of substantially larger diameter than the upper roller mounted thereon and disposed between the two belts, the adjacent edges of the belts being disposed to run against the opposite sides of the disk, whereby said belts are maintained in spaced relation and the windrow is raised from said belts and delivered to the harvester.

14. A pick-up adapted to be attached to a traveling harvester comprising an endless conveyor consisting of at least one flexible endless belt trained over upper and lower rollers, means for supporting said conveyor in a downwardly and forwardly inclined position for picking up a windrow and conveying it to the harvester as the latter is drawn over the field, and a plurality of pick-up fingers on said belt, means for driving the conveyor with the upper run traveling rearwardly and the lower run traveling forwardly, said fingers being disposed to brush the ground surface as the conveyor belt passes around the lower roller, said fingers being connected to said belt so as to have sufficient yieldability to cause them to pass over rocks of walnut size without dislodging them upon engagement therewith as the harvester is drawn over the field.

15. A pick-up adapted to be attached to a traveling harvester comprising an endless conveyor consisting of at least one flexible endless belt trained over upper and lower rollers, means for supporting said conveyor in a downwardly and forwardly inclined position for picking up a windrow and conveying it to the harvester as the latter is drawn over the field, and a plurality of pick-up fingers on said belt, means for driving the conveyor with the upper run traveling rearwardly and the lower run traveling forwardly, said fingers being disposed to brush the ground surface as the conveyor belt passes around the lower roller, said fingers being of spring steel wire having a diameter of the order of one-tenth of an inch whereby said fingers have sufficient flexibility to pass over rocks of walnut size without dislodging them upon engagement therewith as the harvester is drawn over the field.

EDWARD G. MELROE.